United States Patent

[11] 3,612,646

| | | |
|---|---|---|
| [72] | Inventors | Merle H. Walker<br>Mohawk;<br>Lawrence S. Burrows, Utica, both of N.Y. |
| [21] | Appl. No. | 884,136 |
| [22] | Filed | Dec. 11, 1969 |
| [45] | Patented | Oct. 12, 1971 |
| [73] | Assignee | Remington Arms Company, Inc.<br>Bridgeport, Conn. |

[54] RIFLE TELESCOPIC GUN SIGHT
4 Claims, 3 Drawing Figs.

[52] U.S. Cl............................................ 350/54,
350/10, 350/175 E, 350/231, 350/232
[51] Int. Cl............................................. G02b 23/00
[50] Field of Search........................... 350/10, 54,
43, 232; 33/50 A; 356/247

[56] References Cited
UNITED STATES PATENTS

| 2,620,706 | 12/1952 | Levin | 350/232 X |
| 2,997,916 | 8/1961 | Freidman et al. | 350/10 |
| 3,481,658 | 12/1969 | Dietrich et al. | 350/10 |
| 3,506,329 | 4/1970 | Weaver | 350/10 |

FOREIGN PATENTS

| 536,556 | 5/1941 | Great Britain | 350/232 |
| 704,350 | 2/1954 | Great Britain | 350/10 |

Primary Examiner—David Schonberg
Assistant Examiner—Ronald J. Stern
Attorneys—John H. Lewis, Jr. and Nicholas Skovran ABSTRACT: The present invention relates to an optical system for telescopes and more particularly it relates to optical improvements in a rifle telescope incorporating a telephoto lens arrangement which has been used to compact the scope and provide a widened field of view. The telescope has been carefully designed to be visibly free of aberrations usually concomitant with telephoto systems. A negative power two-element component has been introduced into the scope as part of the objective lens arrangement. This insertion serves to produce the telephoto effect. The selection of the optical parameters, including lens element radii, thicknesses, airspaces, and optical glass, has been made to insure an optical system whose performance is equal or better than existing rifle telescopes, but which has reduced size and weight.

Inventors:
Merle H. Walker,
Lawrence S. Burrows

Fig. 3.

| COMPONENT | MEMBER (DOUBLET) | ELEMENT (LENS) | RADII ** | DISTANCES & THICKNESSES | $N_D$ | $\nu$ |
|---|---|---|---|---|---|---|
| \multicolumn{7}{|c|}{20X LENS SYSTEM FOCUSED AT INFINITY} ||||||| 
| OBJECTIVE | A | I | $R_1 = 110.11$ | $t_1 = 4.826$ | 1.51700 | 64.5 |
| | | | $R_2 = -101.96$ | | | |
| | | II | $R_3 = -101.96$ | $t_2 = 3.998$ | 1.64900 | 33.8 |
| | | | $R_4 = -595.86$ | $S_1 = 194.8 \oplus$ | | |
| | B | III | $R_5 = -36.58$ | $t_3 = 1.981$ | 1.52860 | 51.6 |
| | | | $R_6 = 30.56$ | | | |
| | | IV | $R_7 = 30.56$ | $t_4 = 2.540$ | 1.72000 | 29.3 |
| | | | $R_8 = -136.73$ | $S_2 = 41.833$ | | |
| ERECTOR | C | V | $R_9 = 235.394$ | $t_5 = 2.209$ | 1.64900 | 33.8 |
| | | | $R_{10} = 18.376$ | | | |
| | | VI | $R_{11} = 18.376$ | $t_6 = 7.620$ | 1.51700 | 64.5 |
| | | | $R_{12} = -17.337$ | $S_3 = 1.000$ | | |
| | D | VII | $R_{13} = 17.337$ | $t_7 = 7.620$ | 1.51700 | 64.5 |
| | | | $R_{14} = -18.376$ | | | |
| | | VIII | $R_{15} = -18.376$ | $t_8 = 2.209$ | 1.64900 | 33.8 |
| | | | $R_{16} = -235.394$ | $S_4 = 74.702$ | | |
| | | | | $S_5 = *27$ TYP. | | |
| EYEPIECE | E | IX | $R_{17} = 291.800$ | $t_9 = 3.505$ | 1.64900 | 33.8 |
| | | | $R_{18} = 36.839$ | | | |
| | | X | $R_{19} = 36.839$ | $t_{10} = 11.430$ | 1.51700 | 64.5 |
| | | | $R_{20} = -36.839$ | $S_6 = 1.000$ | | |
| | F | XI | $R_{21} = 36.839$ | $t_{11} = 11.430$ | 1.51700 | 64.5 |
| | | | $R_{22} = -36.839$ | | | |
| | | XII | $R_{23} = -36.839$ | $t_{12} = 3.505$ | 1.64900 | 33.8 |
| | | | $R_{24} = -291.800$ | $S_7 = \bullet 57.15$ | | |

\* DISTANCE ADJUSTABLE TO INDIVIDUAL EYE
● EYE RELIEF
⊕ DISTANCE VARIES WITH ADJUSTMENT FOR RANGE
\*\* LENS SURFACES DESIGNATED BY THE (-) SIGN ARE CONCAVE TOWARD THE OBJECTIVE SIDE OF THE SYSTEM.

Inventors:
Merle H. Walker,
Lawrence S. Burrows

John H Lewis Jr.
by Nicholas Skovran
Attorneys

RIFLE TELESCOPIC GUN SIGHT

The present invention pertains to a rifle telescope, and more particularly to a rifle telescope for critical accuracy bench rest shooting having a telephoto lens system.

Although telephoto techniques are widely employed in the photographic arts, it is believed that this is the first attempt to employ these methods to rifle telescopes, and more specifically to provide the objective lens arrangement of the scope with a telephoto construction.

The subject invention is for a telescope having 20X magnification, eye relief of 2¼ inches, and an exit pupil diameter of 1.8 mm.

Ordinarily, telephoto systems have an asymmetrical construction which results in pronounced aberrational defects. There are many types of image aberrations that may be introduced, and they are so closely influenced by changes in the system that a change in any one of them affects all the others. The various aberrations which are likely to result are:
 spherical aberration,
 coma,
 astigmatism,
 curvature of field,
 distortion,
 longitudinal color, and
 lateral color.

The present system has been corrected for the above aberrations by independently designing the objective, erector, and eyepiece lenses to be free of these errors over the visible spectrum. This is considered to be one of the most novel features of said system, since present scopes cannot provide this quality of optics.

Still another novel feature is providing the telephoto effect using readily available lenses in standard rifle telescopes. Thus, the cost of utilizing the telephoto effect has been minimized. The telephoto effect has been achieved by adding a negative lens behind the primary objective lens. The objective lens arrangement was then matched to erector and eyepiece lenses to complete the system.

The invention has many advantages over the scopes now used for critical accuracy bench rest shooting. These telescopes have been excessively lengthy (generally about 26 inches long). This requires that these scopes be mounted upon the forward part of the barrel. Such a telescope is shown in the U.S. patent to Bronnimann, Pat. No. 2,896,326, issued 28 July, 1959.

For many reasons, as will be set forth hereinafter, this forward mount was undesirable.

In the first instance, accuracy is inhibited by mounting upon the barrel, because the setting can be easily disturbed. The vibrations and shock caused by the rigors of shooting, tend to loosen and change the setting of the mount. Then, too, the heat generated in the barrel tends to cause expansion and contraction of the metal parts, hence, problems with the setting.

In the second instance, a barrel mounting is inconvenient if one desires to change the barrel of the gun. To do so would require a complete remounting of the scope.

In the third place, a longer telescope is inherently heavier than a shorter scope. Since in bench shooting competition, a weight limitation is usually placed upon the rifle and telescope combinations, a serious handicap is frequently put upon the shooter who must use a longer telescope. Very often, he is unable to use a longer scope with his particular firearm. A heavier scope and gun combination is also more inconvenient to carry about or set up for a competitive match.

The present telescopic system is very compact (only 16¼ inches long). The use of telephoto techniques has enabled the scope to be shorter, lighter, and have a wider field of view. The shortened length allows the telescope to be mounted entirely upon the receiver of the gun (both front and rear mounts). The lighter weight of this telescopic sight, 19⅝ ounces including mounts and bases, provides competitive shooters a greater flexibility in assembling rifle and scope combinations to meet the competitive weight limitations.

It is an object of the invention to provide a telescopic gun sight for firearms which has a telephoto lens arrangement.

It is another object of the invention to provide a rifle telescope with a telephoto objective component.

It is contemplated in this invention to provide a rifle scope which is lighter, shorter, and has a wider field of view.

It is further contemplated to provide a scope having doublet lenses for all achromats to provide high quality color correction.

It is a further object of this invention to provide a telescope with a telephoto effect, that is free of aberrations for all image errors over the visible spectrum.

It is still a further object of this invention to provide a low-cost rifle telescope of the highest possible optical quality.

The invention will be better understood and other objects and advantages will become apparent with reference to the following detailed description taken in conjunction with the accompanying drawings in which:

FIG. 3 illustrates a chart for the constructional data for the lens system of FIG. 2.

Generally speaking, this invention is an optical system for visual sighting for projectile firing devices. Said system is composed of objective, erector, and eyepiece lens components in combination. The present invention provides the improvement of an objective lens arrangement of telephoto construction.

The above system has been so designed that the individual components have been independently corrected for all image errors over the visible spectrum, including:
 spherical aberration,
 coma,
 astigmatism,
 curvature of field,
 distortion,
 longitudinal color, and
 lateral color.

Figure 2:
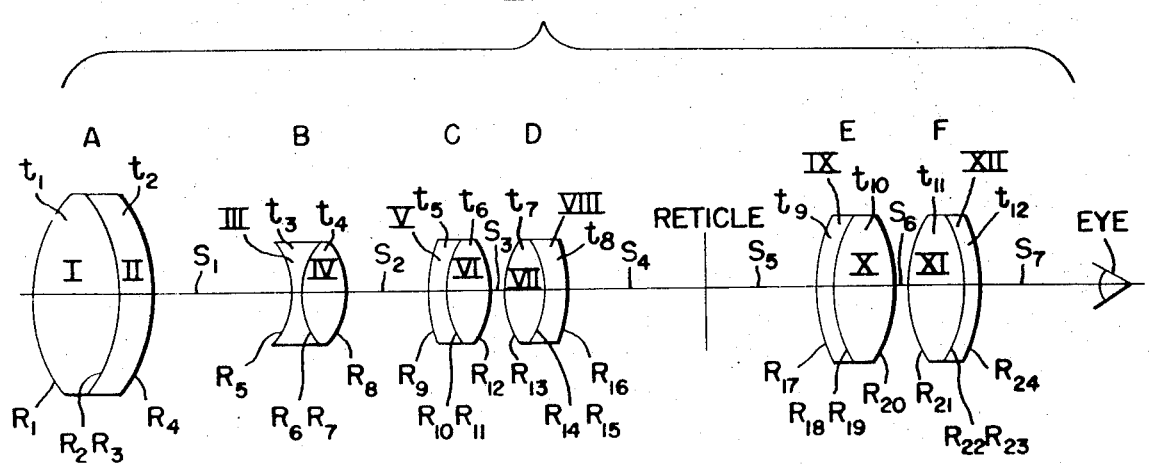
FIG. 2 depicts the optical arrangement for the various lens elements of the invention.

The system may be described as a plurality of lens members A through F, said members alphabetically denominated in the order of appearance from front to rear as shown in FIG. 2. Said system consists of a first doublet component of positive focal length and double convex in form (Member A).

A second doublet (member B) is airspaced from the first member. It has a negative focal length and is meniscus in form facing away from the eyepiece focal plane.

Four additional doublets of positive focal length and double convex in form are airspaced from member B and respectively airspaced from each other. Said doublets are denominated as members C, D, E, and F, respectively.

The aforementioned system may be further described as a plurality of lens elements in optical alignment wherein the objective lens arrangement consisting of elements I through IV, the erector lens arrangement consisting of elements V through VIII, and the eyepiece lens arrangement consisting of elements IX through XII, said elements numerically denominated in the order of appearance from front to rear as also shown in FIG. 2.

The telephoto objective consists of two doublets, the first doublet (member A) having elements I and II. The first element is positive in power, double convex in form, and in contact with the second meniscus negative element. The second doublet (member B) of the objective is airspaced from the first doublet and consists of elements III and IV. The first of these elements is a double concave negative element in contact with the second lens which has positive power and is double convex in form.

Airspaced from the objective elements above is the two doublet erecting system. The first doublet (member C) of this system consists of elements V and VI, which are a first meniscus negative element in contact with a second double convex positive element.

The second doublet (member D) airspaced from the first doublet of this system consists of elements VII and VIII. Element VII is a double convex positive element in contact with element VIII, a negative meniscus lens.

The system is completed by the addition of a two-doublet symmetrical type or Plössl-type construction eyepiece airspaced from the previous element.

The first doublet (member E) consisting of elements IX and X, wherein element IX is a negative meniscus lens in contact with element X, which is a double convex positive element.

The second doublet (member F) is airspaced from the preceding doublet and consists of elements XI and XII. The first lens is a double convex positive element and is in contact with the second meniscus negative element.

Figure 1:
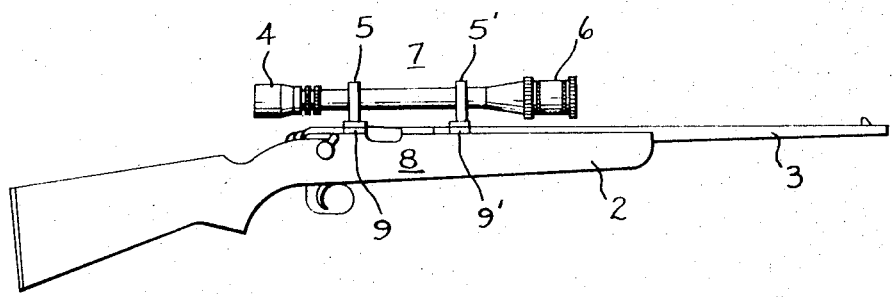
FIG. 1 shows the telescopic gun sight of this invention, mounted upon the receiver of a rifle.

Now referring to FIG. 1, a telescopic sight of this invention is shown mounted upon a firearm. The firearm has a stock 2 with a barrel 3 resting therein. The receiver of the gun is generally denominated by 8, and has a telescopic sight 7 mounted thereon. The telescopic sight is attached to the receiver at points 9 and 9', by means of mounting bars 5 and 5', respectively. The front of the telescope has a telephoto objective lens arrangement 6, and an eyepiece lens arrangement in the rear at 4. (The erector is not shown).

The focal lengths of the objective, erector, and eyepiece, respectively, are given below in terms of the overall length of the system:

F (objective) = 0.495 L
F (erector) = 0.042 L
F (eyepiece) = 0.085 L.

where: L is defined as the distance from the first surface of the objective to the exit pupil of the system when the system is focused for an object at infinity. The telephoto ratio is given as 0.90, and is defined as the ratio between $a$ and $b$ where:

$a$ is the distance from the first surface of the first objective lens to the image plane of the objective component with the object located at infinity, and $b$ is the focal length of the objective component.

The focal length ratio of the objective and erector components taken in combination is 0.49 where said ratio is defined as that between $a$ and $b$ where:

$a$ is the distance from the first surface of the objective to the image plane of the erector, with the object taken at infinity; and $b$ is the focal length of the objective and erector lenses taken in combination.

The focal lengths of members A through F, as hereinbefore defined, are listed, respectively, below:

| | | | | |
|---|---|---|---|---|
| 0.422 L | < | $F_A$ | < | 0.522 L |
| −0.830 L | < | $F_B$ | <− | 0.680 L |
| 0.076 L | < | $F_C$ | < | 0.092 L |
| 0.076 L | < | $F_D$ | < | 0.092 L |
| 0.142 L | < | $F_E$ | < | 0.186 L |
| 0.142 L | < | $F_F$ | < | 0.186 L |

$F_A =$ 0.427 L
$F_B =$ −0.755 L
$F_C =$ 0.084 L
$F_D =$ 0.084 L
$F_E =$ 0.169 L
$F_F =$ 0.169 L.

where: L is again defined as the overall length of the system measured from the first surface of the objective to exit pupil of the system with the object located at infinity.

Contributory toward the achievement of the objects of this invention, the constructional data for the lens system as shown in FIG. 2, should have the values stated hereinbelow, wherein $R_1$ to $R_{24}$ denote the radii of curvature of the successive lens surfaces, numerically denominated in order of appearance from front to rear of said system, and where positive values of R designate surfaces which are convex toward the object side of the system, $t_1$ to $t_{12}$ designate the axial lens thicknesses, $S_1$ to $S_7$ designate the spaces between the lenses, and $n_D$ and Y designate, respectively, the refractive index and Abbe number (index of dispersion) of the lens materials:

| | | | | |
|---|---|---|---|---|
| 58.0 | < | $Y_I$ | < | 65.0 |
| 33.0 | < | $Y_{II}$ | < | 36.6 |
| 47.3 | < | $Y_{III}$ | < | 54.6 |
| 28.0 | < | $Y_{IV}$ | < | 30.5 |
| 33.0 | < | $Y_V$ | < | 36.6 |
| 58.0 | < | $Y_{VI}$ | < | 65.0 |
| 58.0 | < | $Y_{VII}$ | < | 65.0 |
| 33.0 | < | $Y_{VIII}$ | < | 36.6 |
| 33.0 | < | $Y_{IX}$ | < | 36.6 |
| 58.0 | < | $Y_X$ | < | 65.0 |
| 58.0 | < | $Y_{XI}$ | < | 65.0 |
| 33.0 | < | $Y_{XII}$ | < | 36.6 |

$R_1$ = 0.234 L
$R_2$ = −0.217 L
$R_3$ = −0.217 L
$R_4$ = −1.270 L
$R_5$ = −0.078 L
$R_6$ = 0.065 L
$R_7$ = 0.065 L
$R_8$ = −0.291 L
$R_9$ = 0.500 L
$R_{10}$ = 0.039 L
$R_{11}$ = 0.039 L
$R_{12}$ = −0.037 L
$R_{13}$ = 0.037 L
$R_{14}$ = −0.039 L
$R_{15}$ = −0.039 L
$R_{16}$ = −0.500 L
$R_{17}$ = 0.620 L
$R_{18}$ = 0.078 L
$R_{19}$ = 0.078 L
$R_{20}$ = −0.078 L
$R_{21}$ = 0.078 L
$R_{22}$ = −0.078 L
$R_{23}$ = −0.078 L
$R_{24}$ = −0.620 L $t_1$ = 0.010 L
$t_2$ = 0.009 L
$t_3$ = 0.004 L
$t_4$ = 0.005 L
$t_5$ = 0.005 L
$t_6$ = 0.017 L
$T_7$ = 0.017 L
$t_8$ = 0.005 L
$t_9$ = 0.008 L
$t_{10}$ = 0.025 L
$t_{11}$ = 0.025 L
$t_{12}$ = 0.008 L $S_1$ = 0.415 L
$S_2$ = 0.089 L
$S_3$ = 0.002 L
$S_4$ = 0.159 L
$S_5$ = 0.058 L
$S_6$ = 0.002 L
$S_7$ = 0.122 L $n_{D_I}$ = 1.517
$n_{D_{II}}$ = 1.649
$n_{D_{III}}$ = 1.529
$n_{D_{IV}}$ = 1.720
$n_{D_V}$ = 1.649
$n_{D_{VI}}$ = 1.517
$n_{D_{VII}}$ = 1.517
$n_{D_{VIII}}$ = 1.649
$n_{D_{IX}}$ = 1.649
$n_{D_X}$ = 1.517
$n_{D_{XI}}$ = 1.517
$n_{D_{XII}}$ = 1.649

$Y_I$ = 64.5
$Y_{II}$ = 33.8
$Y_{III}$ = 51.6
$Y_{IV}$ = 29.3
$Y_V$ = 33.8
$Y_{VI}$ = 64.5
$Y_{VII}$ = 64.5
$Y_{VIII}$ = 33.8
$Y_{IX}$ = 33.8
$Y_X$ = 64.5
$Y_{XI}$ = 64.5
$Y_{XII}$ = 33.8

Note:

Negative values for R are for concave surfaces facing toward the object side of the system, L having the same definition as hereinbefore given.

Specifically, the preferred form of the invention in numerically given in the chart as appearing in FIG. 3 of the drawing and as repeated herebelow, the designations and denominations therein being the same as those mentioned heretofore:

20X LENS SYSTEM FOCUSED AT INFINITY

| Component | Member (doublet) | Element (lens) | Radii [1] | Distances and thicknesses | $N_D$ | $\nu$ |
|---|---|---|---|---|---|---|
| Objective | A | I | $R_1=110.11$ | $t_1=4.826$ | 1.51700 | 64.5 |
| | | | $R_2=-101.96$ | | | |
| | | II | $R_3=-101.96$ | $t_2=3.998$ | 1.64900 | 33.8 |
| | | | $R_4=-595.86$ | | | |
| | | | | $S_1=194.8$ [2] | | |
| | B | III | $R_5=-36.58$ | $t_3=1.981$ | 1.52860 | 51.6 |
| | | | $R_6=30.56$ | | | |
| | | IV | $R_7=30.56$ | $t_4=2.540$ | 1.72000 | 29.3 |
| | | | $R_8=-136.73$ | | | |
| | | | | $S_2=41.833$ | | |
| Erector | C | V | $R_9=235.394$ | $t_5=2.209$ | 1.64900 | 33.8 |
| | | | $R_{10}=18.376$ | | | |
| | | VI | $R_{11}=18.376$ | $t_6=7.620$ | 1.51700 | 64.5 |
| | | | $R_{12}=-17.337$ | | | |
| | | | | $S_3=1.000$ | | |
| | D | VII | $R_{13}=17.337$ | $t_7=7.620$ | 1.51700 | 64.5 |
| | | | $R_{14}=-18.376$ | | | |
| | | VIII | $R_{15}=-18.376$ | $t_8=2.209$ | 1.64900 | 33.8 |
| | | | $R_{16}=-235.394$ | | | |
| | | | | $S_4=74.702$ | | |
| | | | | $S_5=27$ typ.[3] | | |
| Eyepiece | E | IX | $R_{17}=291.800$ | $t_9=3.505$ | 1.64900 | 33.8 |
| | | | $R_{18}=36.839$ | | | |
| | | X | $R_{19}=36.839$ | $t_{10}=11.430$ | 1.51700 | 64.5 |
| | | | $R_{20}=-36.839$ | | | |
| | | | | $S_6=1.000$ | | |
| | F | XI | $R_{21}=36.839$ | $t_{11}=11.430$ | 1.51700 | 64.5 |
| | | | $R_{22}=-36.839$ | | | |
| | | XII | $R_{23}=-36.839$ | $t_{12}=3.505$ | 1.64900 | 33.8 |
| | | | $R_{24}=-291.800$ | | | |
| | | | | $S_7=57.15$ [4] | | |

[1] Lens surfaces designated by the (−) sign are concave toward the objective side of the system.
[2] Distance varies with adjustment for range.
[3] Distance adjustable to individual eye.
[4] Eye relief.

Although only a single specific form of this invention has been shown and described, various modifications may be made in the constructional data and the various uses for which the invention is now presently used, as will be evident to those skilled in the art.

It is recognized by the inventors that the magnification of the scope depends upon the ratio of the focal lengths of the objective to the eyepiece, times the magnification factor introduced by the erecting system. While the system disclosed works at a magnification of 20X, it is contemplated and obvious to those in the art, that this magnification range may be easily altered by hanging the focal length of any component in the system.

For example, this scope may be modified to be useable as a varmint-type telescope, wherein the modifications necessary to do so involve a decrease in magnification to about 12X, with a corresponding increase in the eye relief.

Although the present invention has been primarily described for use in critical accuracy bench rest rifles, it is also conceivable to those in the art that said scope may be used for a variety of other projectile firing devices. The foregoing description, therefore, is only meant to describe the invention, and is not to be interpreted as limiting the breadth and scope of the system.

Modifications and variations as can be made by those skilled in the art are considered not to depart from the spirit and scope of the appended claims.

We claim:

1. An optical system for visual sighting for projectile firing devices having components of objective, erector, and eyepiece lenses in combination, the objective lens arrangement consisting of elements I through IV, the erector lens arrangement consisting of elements V through VIII, and the eyepiece lens arrangement consisting of elements IX through XII, said elements numerically denominated in the order of appearance from front to rear, said system further defined as a plurality of lens elements in optical alignment comprising:
   a. a tow-doublet telephoto-type objective, wherein:
      the first doublet, member A, consists of a first positive double convex element in contact with a second meniscus negative element; and
      rearwardly airspaced therefrom a second doublet, member B, consisting of a first double concave negative element in contact with a second double convex positive element; and
   b. rearwardly airspaced therefrom a two-doublet erecting system wherein:
      the first doublet, member C, consists of a first meniscus negative element in contact with a second double convex positive element; and
      rearwardly airspaced therefrom a second doublet, member D, consisting of a first double convex positive element in contact with a second meniscus negative element; and
   c. rearwardly airspaced therefrom a two-doublet symmetrical-type construction eyepiece, wherein:
the first doublet, member E, consists of a first meniscus negative element in contact with a second double convex positive element; and
rearwardly airspaced therefrom a second doublet, member F, consisting of a first double convex positive element in contact with a second meniscus negative element;
said system having the following ratios:

$$F_A = 0.47 L$$
$$F_B = -0.75 L$$
$$F_C = 0.08 L$$
$$F_D = 0.08 L$$
$$F_E = 0.16 L$$
$$F_F = 0.16 L,$$

where: L is defined as the overall length of the system measured from the first surface of the objective to the exit pupil of the system with the object located at infinity;
$F_A$ through $F_F$ are focal lengths of members A through F, respectively.

2. The optical system of claim 26, wherein:
$$F_1 = 0.49 L$$
where: $F_1$ is the combined focal length of the objective lenses;
$$F_2 = 0.04 L$$
where: $F_2$ is the combined focal length of the erector lenses; and
$$F_3 = 0.08 L$$
where: $F_3$ is the combined focal length of the eyepiece lenses.

3. An optical system for visual sighting for projectile firing devices having components of objective, erector, and eyepiece lenses in combination, the objective lens arrangement consisting of elements I through IV, the erector lens arrangement consisting of elements V through VIII, and the eyepiece lens arrangement consisting of elements IX through XII, said elements numerically denominated in the order of appearance from front to rear, said system further defined as a plurality of lens elements in optical alignment comprising:

a. a two-doublet telephoto-type objective, wherein:
the first doublet, elements I and II, consists of a first positive double convex element in contact with a second meniscus negative element, and rearwardly airspaced therefrom;
a second doublet, elements III and IV, consisting of a first double concave negative element in contact with a second double convex positive element, and rearwardly airspaced therefrom;

b. a two-doublet erecting system wherein:
the first doublet, elements V and VI, consists of a first meniscus negative element in contact with a second double convex positive element, and rearwardly airspaced therefrom;
a second doublet, elements VII and VIII, consisting of a first double convex positive element in contact with a second meniscus negative element, and rearwardly airspaced therefrom;

c. a two-doublet symmetrical-type construction eyepiece, wherein:
the first doublet, elements IX and X, consists of a first meniscus negative element on contact with a second double convex positive element, and rearwardy airspaced therefrom;
a second doublet, elements XI and XII, consisting of a first double convex positive element in contact with a second meniscus negative element,
said elements having radii of curvature of the successive lens surfaces which are denominated $R_1$ to $R_{24}$,

| | | |
|---|---|---|
| $R_1$ | = | 0.234 L |
| $R_2$ | = | −0.217 L |
| $R_3$ | = | −0.217 L |
| $R_4$ | = | −1.270 L |
| $R_5$ | = | −0.078 L |
| $R_6$ | = | 0.065 L |
| $R_7$ | = | 0.065 L |
| $R_8$ | = | −0.291 L |
| $R_9$ | = | 0.500 L |
| $R_{10}$ | = | 0.039 L |
| $R_{11}$ | = | 0.039 L |
| $R_{12}$ | = | −0.037 L |
| $R_{13}$ | = | 0.037 L |
| $R_{14}$ | = | −0.039 L |
| $R_{15}$ | = | −0.039 L |
| $R_{16}$ | = | −0.500 L |
| $R_{17}$ | = | 0.620 L |
| $R_{18}$ | = | 0.078 L |
| $R_{19}$ | = | 0.078 L |
| $R_{20}$ | = | −0.078 L |
| $R_{21}$ | = | 0.078 L |
| $R_{22}$ | = | −0.078 L |
| $R_{23}$ | = | −0.078 L |
| $R_{24}$ | = | −0.621 L |

| | | |
|---|---|---|
| $t_1$ | = | 0.010 L |
| $t_2$ | = | 0.009 L |
| $t_3$ | = | 0.004 L |
| $t_4$ | = | 0.005 L |
| $t_5$ | = | 0.005 L |
| $t_6$ | = | 0.017 L |
| $t_7$ | = | 0.017 L |
| $t_8$ | = | 0.005 L |
| $t_9$ | = | 0.008 L |
| $t_{10}$ | = | 0.025 L |
| $t_{11}$ | = | 0.025 L |
| $t_{12}$ | = | 0.008 L, | the lens surfaces which are of positive value being convex toward the object side of the system, the lens thicknesses being denominated $t_1$ to $t_{12}$, $S_1$ to $S_7$ denominating the axial space between the successive lens doublets, and $n_D$ and Y represent, respectively, the refractive index and the Abbe number of said elements, values for R, t, S, $n_D$, and Y, respectively, as set forth herein:

| | | |
|---|---|---|
| $S_1$ | = | 0.415 L |
| $S_2$ | = | |
| $S_3$ | = | 0.002 L |
| $S_4$ | = | 0.159 L |
| $S_5$ | = | 0.058 L |
| $S_6$ | = | 0.002 L |
| $S_7$ | = | 0.122 L |

| | | |
|---|---|---|
| $n_{D_I}$ | = | 1.517 |
| $n_{D_{II}}$ | = | 1.649 |
| $n_{D_{III}}$ | = | 1.529 |
| $n_{D_{IV}}$ | = | 1.720 |
| $n_{D_V}$ | = | 1.649 |
| $n_{D_{VI}}$ | = | 1.517 |
| $n_{D_{VII}}$ | = | 1.517 |
| $n_{D_{VIII}}$ | = | 1.649 |
| $n_{D_{IX}}$ | = | 1.649 |
| $n_{D_X}$ | = | 1.517 |
| $n_{D_{XI}}$ | = | 1.517 |
| $n_{D_{XII}}$ | = | 1.649 |

| | | |
|---|---|---|
| $Y_I$ | = | 64.5 |
| $Y_{II}$ | = | 33.8 |
| $Y_{III}$ | = | 51.6 |
| $Y_{IV}$ | = | 29.3 |
| $Y_V$ | = | 33.8 |
| $Y_{VI}$ | = | 64.5 |
| $Y_{VII}$ | = | 64.5 |
| $Y_{VIII}$ | = | 33.8 |
| $Y_{IX}$ | = | 33.8 |
| $Y_X$ | = | 64.5 |
| $Y_{XI}$ | = | 64.5 |
| $Y_{XII}$ | = | 33.8 | where: L is defined as the overall length of the system measured from the first surface of the objective to the exit pupil of the system with the object located at infinity.

4. An optical system for visual sighting for projectile firing devices having components of objective, erector, and eyepiece lenses in combination, the objective lens arrangement consisting of elements I through IV, the erector lens arrangement consisting of elements V through VIII, and the eyepiece lens arrangement consisting of elements IX through XII, said elements numerically denominated in the order of appearance from front to rear, said system further defined as a plurality of lens elements in optical alignment comprising:

a. a two-doublet telephoto-type objective, wherein:
   the first doublet, elements I and II, consists of a first positive double convex element in contact with a second meniscus negative element, and rearwardly airspaced therefrom;
   a second doublet, elements III and IV, consisting of a first double concave negative element in contact with a second double convex positive element, and rearwardly airspaced therefrom;
b. a two-doublet erecting system wherein:
   the first doublet, elements V and VI, consists of a first meniscus negative element in contact with a second double convex positive element, and rearwardly airspaced therefrom;
   a second doublet, elements VII and VIII, consisting of a first double convex positive element in contact with a second meniscus negative element, and rearwardly airspaced therefrom;
c. a two-doublet symmetrical-type construction eyepiece, wherein:
   the first doublet, elements IX and X, consists of a first meniscus negative element in contact with a second double convex positive element, and rearwardly airspaced therefrom;
   a second doublet, elements XI and XII, consisting of a first double convex positive element in contact with a second meniscus negative element,
   said system further characterized by the values as substantially set forth hereinafter, said values for R, $t$, S, $n_D$, and Y, pertaining to the radii of curvature of the lens elements, the lens thicknesses, the distance between said doublets, the index of refraction, and the index of dispersion, respectively:

20X LENS SYSTEM FOCUSED AT INFINITY

| Component | Member (doublet) | Element (lens) | Radii [1] | Distances and thicknesses | $N_D$ | $\nu$ |
|---|---|---|---|---|---|---|
| Objective | A | I | $R_1=110.11$ | $t_1=4.826$ | 1.51700 | 64.5 |
|  |  |  | $R_2=-101.96$ |  |  |  |
|  |  | II | $R_3=-101.96$ | $t_2=3.998$ | 1.64900 | 33.8 |
|  |  |  | $R_4=-595.86$ | $S_1=194.8$ [2] |  |  |
|  | B | III | $R_5=-36.58$ | $t_3=1.981$ | 1.52860 | 51.6 |
|  |  |  | $R_6=30.56$ |  |  |  |
|  |  | IV | $R_7=30.56$ | $t_4=2.540$ | 1.72000 | 29.3 |
|  |  |  | $R_8=-136.73$ | $S_2=41.833$ |  |  |
| Erector | C | V | $R_9=235.394$ | $t_5=2.209$ | 1.64900 | 33.8 |
|  |  |  | $R_{10}=18.376$ |  |  |  |
|  |  | VI | $R_{11}=18.376$ | $t_6=7.620$ | 1.51700 | 64.5 |
|  |  |  | $R_{12}=-17.337$ | $S_3=1.000$ |  |  |
|  | D | VII | $R_{13}=17.337$ | $t_7=7.620$ | 1.51700 | 64.5 |
|  |  |  | $R_{14}=-18.376$ |  |  |  |
|  |  | VIII | $R_{15}=-18.376$ | $t_8=2.209$ | 1.64900 | 33.8 |
|  |  |  | $R_{16}=-235.394$ | $S_4=74.702$ $S_5=27$ typ. [3] |  |  |
| Eyepiece | E | IX | $R_{17}=291.800$ | $t_9=3.505$ | 1.64900 | 33.8 |
|  |  |  | $R_{18}=36.839$ |  |  |  |
|  |  | X | $R_{19}=36.839$ | $t_{10}=11.430$ | 1.51700 | 64.5 |
|  |  |  | $R_{20}=-36.839$ | $S_6=1.000$ |  |  |
|  | F | XI | $R_{21}=36.839$ | $t_{11}=11.430$ | 1.51700 | 64.5 |
|  |  |  | $R_{22}=-36.839$ |  |  |  |
|  |  | XII | $R_{23}=-36.839$ | $t_{12}=3.505$ | 1.64900 | 33.8 |
|  |  |  | $R_{24}=-291.800$ | $S_7=57.15$ [4] |  |  |

[1] Lens surfaces designated by the (−) sign are concave toward the objective side of the system.
[2] Distance varies with adjustment for range.
[3] Distance adjustable to individual eye.
[4] Eye relief.